United States Patent [19]

Langhauser et al.

[11] Patent Number: 5,753,773
[45] Date of Patent: May 19, 1998

[54] MULTIPHASE BLOCK OF PROPYLENE, COMPRISING COPOLYMERS OF PROPYLENE

[75] Inventors: Franz Langhauser, Bad Durkheim; Juergen Kerth, Carlsberg; Patrik Mueller, Kaiserslautern; Meinolf Kersting, Bad Durkheim; Guenther Schweier, Friedelsheim, all of Germany

[73] Assignee: BASF Aktiengesellschaft, Ludwigshafen, Germany

[21] Appl. No.: 545,823

[22] PCT Filed: May 17, 1994

[86] PCT No.: PCT/EP94/01591

§ 371 Date: Nov. 9, 1995

§ 102(e) Date: Nov. 9, 1995

[87] PCT Pub. No.: WO94/28042

PCT Pub. Date: Dec. 8, 1994

[30] Foreign Application Priority Data

May 27, 1993 [DE] Germany .................. 43 17 655.0

[51] Int. Cl.$^6$ ............................................. C08F 297/08
[52] U.S. Cl. .................. 525/323; 525/268; 525/321; 525/189; 526/901; 526/943
[58] Field of Search ................... 525/268, 323; 526/901

[56] References Cited

U.S. PATENT DOCUMENTS

| 4,977,210 | 12/1990 | Kerth et al. ................... 525/53 |
| 5,232,993 | 8/1993 | Winter et al. ................. 525/247 |
| 5,280,074 | 1/1994 | Schreck et al. ............... 525/240 |
| 5,298,561 | 3/1994 | Cecchin et al. ............... 525/240 |
| 5,322,902 | 6/1994 | Schreck et al. ............... 525/247 |
| 5,332,789 | 7/1994 | Tanaka et al. ................. 525/323 |
| 5,346,925 | 9/1994 | Sugano et al. ................. 521/54 |
| 5,486,572 | 1/1996 | Fujita et al. ................... 525/247 |

FOREIGN PATENT DOCUMENTS

| 433 990 | 6/1991 | European Pat. Off. . |
| 38 27 565 | 2/1990 | Germany . |
| 40 01 157 | 7/1991 | Germany . |
| 41 30 429 | 3/1993 | Germany . |

*Primary Examiner*—Mark Nagumo
*Attorney, Agent, or Firm*—Keil & Weinkauf

[57] ABSTRACT

Multiphase block copolymers of propylene comprising
a) a polymer of propylene with from 0 to 5% by weight of further $C_2$–$C_{10}$ 1-alkenes,
b) a copolymer of propylene with from 5 to 98% by weight of further $C_2$–$C_{10}$ 1-alkenes, the multiphase block copolymers having a melting point of less than 155° C. and a stiffness (shear modulus G) conforming to the following condition (I):

$$G\ \text{modulus} > 800 \times \frac{M_{a)}}{M_{co}} \quad \text{(I)}$$

where $M_{a)}$ denotes the amount of propylene polymer a) and $M_{co}$ denotes the amount of the multiphase block copolymer. are obtainable in particular by polymerization by means of metallocene-containing catalyst systems.

12 Claims, No Drawings

MULTIPHASE BLOCK OF PROPYLENE, COMPRISING COPOLYMERS OF PROPYLENE

The present invention relates to multiphase block copolymers of propylene comprising
a) a polymer of propylene with from 0 to 5% by weight of further $C_2$–$C_{10}$ 1-alkenes,
b) a copolymer of propylene with from 5 to 98% by weight of further $C_2$–$C_{10}$ 1-alkenes,
the multiphase block copolymers having a melting point of less than 155° C. and a stiffness (shear modulus G) conforming to the following condition (I):

$$G\ \text{modulus} > 800 \times \frac{M_{a)}}{M_{\infty}} \tag{I}$$

where $M_{a)}$ denotes the amount of propylene polymer a) and $M_{\infty}$ denotes the amount of the multiphase block copolymer.

The invention further relates to the use of the multiphase block copolymers thus obtained for producing fibers, films/sheets and shaped articles, and also to the thus obtainable fibers, films/sheets and shaped articles comprising the multiphase block copolymers as essential component.

Because of their property profile, multiphase block copolymers are widely used, for example in motor vehicle construction, in the production of impact-modified consumer durables such as hard shell suitcases or plastic storage vessels, and also for producing office film/sheet.

DE-A-38 27 565 and DE-A-40 01 157 disclose copolymers based on propylene and ethylene which are produced using supported titanium catalysts. However, these copolymers have a wide molecular weight distribution which is undesirable for technical reasons. In addition, the copolymers disclosed by these laid-open applications no longer have fully satisfactory mechanical properties in particular when their melting points are distinctly reduced.

EP-A-433 990 describes a process for producing block copolymers of propylene wherein a metallocene catalyst was used for the polymerization, and the first stage of the two-stage process involves the production of a crystalline propylene polymer in liquid monomer. The block copolymers described therein have good low temperature impact toughness, in particular.

DE-A-41 30 429 discloses a process for producing multiphase block copolymers of propylene with the aid of metallocene catalyst systems that leads to block copolymers having satisfactory mechanical properties. For some sectors, however, the shape stability of the prior art copolymers of propylene is not always sufficiently high. This is in particular the case when such copolymers have a low melting point to facilitate their processing.

It is an object of the present invention to remedy the disadvantages described and to develop novel copolymers of propylene which shall possess, inter alia, a high shape stability combined with ease of processing.

We have found that this object is achieved by the above-defined multiphase block copolymers of propylene.

They comprise a polymer of propylene a) with from 0 to 5% by weight, in particular with from 0 to 3% by weight, of further $C_2$–$C_{10}$ 1-alkenes and a copolymer of propylene b) with from 5 to 98% by weight, in particular with from 10 to 96% by weight, of further $C_2$–$C_{10}$ 1-alkenes. In particularly preferred block copolymers of propylene, polymer a) is a propylene homopolymer and copolymer b) is a copolymer of propylene with from 15 to 95% by weight of further $C_2$–$C_{10}$ 1-alkenes. The term $C_2$–$C_{10}$ 1-alkenes is to be understood as meaning in particular $C_2$–$C_{18}$ 1-alkenes such as, for example, ethylene, 1-butene, 1-pentene, 1-hexene, 1-heptene or 1-octene and also mixtures of a plurality of these 1-alkenes. Preferred $C_2$–$C_4$ 1-alkenes are ethylene, 1-butene and mixtures thereof.

If desired, the block copolymers of the present invention may also comprise two or more mutually different copolymers of propylene b), in which case these copolymers may differ not only in respect of the level of copolymerized $C_2$–$C_{10}$ 1-alkene but also in respect of the nature of the copolymerized $C_2$–$C_{10}$ 1-alkene. Preference, however, is given to diphase block copolymers with one copolymer b).

The multiphase block copolymers of the present invention have a melt flow index of from 0.1 to 100 g/10 min, in particular of from 0.5 to 50 g/10 min, at 230° C. under a weight of 2.16 kg. The melt flow index is that quantity of polymer in grams which the test apparatus standardized to DIN 53 735 extrudes within 10 minutes at a temperature of 230° C. under a weight of 2.16 kg.

Preferably the multiphase block copolymers of the present invention comprise from 20 to 98% by weight, in particular from 50 to 90% by weight, of polymer a) and from 2 to 80% by weight, in particular from 10 to 50% by weight, of copolymer(s) b).

The multiphase propylene block copolymers of the present invention are further characterized by a melting point of less than 155° C., in particular of less than 150° C., and a stiffness (shear modulus G) conforming to the following condition (I):

$$G\ \text{modulus} > 800 \times \frac{M_{a)}}{M_{\infty}} \tag{I}$$

where $M_{a)}$ denotes the amount of propylene polymer a) and $M_{\infty}$ denotes the amount of the multiphase block copolymer. The amounts are by weight. By multiphase block copolymer is meant the total polymer comprising propylene polymer a) and copolymer b).

The melting point of the multiphase block copolymer is determined by differential scanning calorimetry (DSC), and the stiffness is determined in accordance with DIN 53 455. The test methods employed are well known to the person of ordinary skill in the art.

The multiphase propylene block copolymer of the present invention may in certain circumstances additionally include per 100 parts by weight of the multiphase block copolymer, as well as customary additives, from 0.01 to 5 parts by weight, in particular from 0.05 to 2 parts by weight, of a nucleating agent. Customary nucleating agents include mineral additives such as talc, silica or kaolin, organic compounds such as mono- and polycarboxylic acids and also their salts, polymers such as ethylene-acrylic ester copolymers, also salts of diesters of phosphoric acid. A particularly preferred nucleating agent comprises dibenzylidenesorbitol or one of its $C_1$–$C_8$alkyl-substituted derivatives. The nucleating agents are mixed into the multiphase block copolymers of the present invention in customary mixing apparatus, for example in drum mixers, mills, extruders, roll systems or kneaders.

The multiphase block copolymers of the present invention are obtainable by multistage polymerization, preferably by conducting a first polymerization stage at temperatures within the range from 0° to 100° C. and pressures within the range from 1 to 300 bar to polymerize propylene, optionally in the presence of further $C_2$–$C_{10}$ 1-alkenes, and then conducting a second polymerization stage at temperatures within the range from 0° to 100° C. and pressures within the range from 1 to 300 bar to polymerize a mixture of propylene and further $C_2$–$C_{10}$ 1-alkenes onto the polymer a)

obtainable from the first polymerization stage. Particularly preferred polymerization conditions are temperatures within the range from 20° to 100° C. and pressures within the range from 5 to 150 bar for both polymerization stages.

The polymerization can be carried out in solution, emulsion, suspension, bulk or the gas phase. Gas phase polymerization is particularly preferred, in particular at temperatures within the range from 30° to 100° C., preferably from 50° to 90° C., and at pressures within the range from 5 to 40 bar, preferably from 15 to 35 bar.

The catalyst systems used for producing the multiphase block copolymers of the present invention include as active constituents metallocene complexes of metals of subgroups IV and V of the Periodic Table, in particular metal complexes of titanium, zirconium, hafnium, vanadium, niobium or tantalum. Preference is given to using complexes where the metal atom is connected via $\pi$ bonds to unsaturated cyclic hydrocarbyls, for example cyclopentadienyl, fluorenyl or indenyl groups. In the preferred complexes, furthermore, the metal atom can be linked to further ligands, in particular to fluorine, chlorine, bromine or iodine or to a $C_1$–$C_{10}$alkyl group, for example to a methyl, ethyl, propyl or butyl group.

Particularly suitable metallocene complexes can be characterized by the following general formula II:

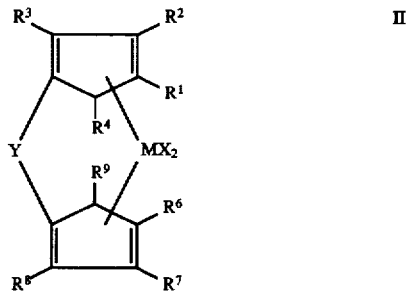

where

M is titanium, zirconium, hafnium, vanadium, niobium or tantalum,

X is fluorine, chlorine, bromine, iodine, hydrogen, $C_1$–$C_{10}$ alkyl, $C_6$–$C_{15}$ aryl or —$OR^5$, where $R^5$ is $C_1$–$C_{10}$ alkyl, $C_6$–$C_{15}$ aryl, alkylaryl, arylalkyl, fluoroalkyl or fluoroaryl having in each case from 1 to 10 carbon atoms in the alkyl moiety and from 6 to 20 carbon atoms in the aryl moiety, $R^1$ to $R^4$ and $R^6$ to $R^9$ are each hydrogen, $C_1$–$C_{10}$ alkyl, 5-, 6- or 7-membered cycloalkyl which in turn may carry $C_1$–$C_{10}$ alkyl substituents, $C_6$–$C_{15}$ aryl or arylalkyl, in which case it is also possible, if desired, for two adjacent radicals to be combined into cyclic saturated, partially saturated or unsaturated groups having from 4 to 15 carbon atoms, or $Si(R^{10})_3$ where $R^{10}$ is $C_1$–$C_{10}$ alkyl, $C_6$–$C_{15}$ aryl or $C_3$–$C_{10}$ cycloalkyl,

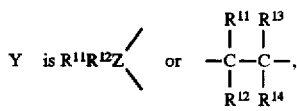

where

Z is silicon, germanium, tin or carbon, $R^{11}$, $R^{12}$, $R^{13}$ and $R^{14}$ are each hydrogen, $C_1$–$C_{10}$ alkyl, $C_3$–$C_{10}$ cycloalkyl or $C_6$–$C_{15}$ aryl, in which case it is also possible, if desired, for two adjacent radicals to be combined into cyclic groups having from 4 to 15 carbon atoms.

In especially suitable compounds of the formula II $R^1$ and $R^6$ are both hydrogen or $C_1$–$C_{10}$ alkyl, $R^4$ and $R^9$ are both hydrogen, methyl, ethyl, isopropyl or tert-butyl, either $R^3$ and $R^8$ are both $C_1$–$C_4$ alkyl and $R^2$ and $R^7$ are both hydrogen, or two adjacent radicals $R^2$ and $R^3$ and also $R^7$ and $R^8$ jointly are cyclic groups having from 4 to 12 carbon atoms, $R^{11}$, $R^{12}$, $R^{13}$ and $R^{14}$ are each hydrogen or $C_1$–$C_8$ alkyl, M is zirconium or hafnium and x is chlorine.

Examples of particularly suitable complexes include dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, ethylenebis(2-methylindenyl)zirconium dichloride, ethylenebis(2-methylindenyl)hafnium dichloride, ethylenebis(2-methylbenzindenyl)zirconium dichloride, ethylenebis(2-methylbenzindenyl)hafnium dichloride, dimethylmethylene-9-fluorenylcyclopentadienylzirconium dichloride, dimethylsilanediylbis(3-tert-butyl-5-methylcyclopentadienyl)-zirconium dichloride, dimethylsilanediylbis(3-tert-butyl-5-ethylcyclopentadienyl)-zirconium dichloride, dimethylsilanediylbis(3-tert-butyl-5-methylcyclopentadienyl)-dimethylzirconium, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(2-methyl-5-methylcyclopentadienyl)-zirconium dichloride, dimethylsilanediylbis(2-ethyl-5-isopropylcyclopentadienyl)-zirconium dichloride, dimethylsilanediylbis(2-methylbenzindenyl)zirconium dichloride, and dimethylsilanediylbis(2-methylindenyl)hafnium dichloride.

Such complexes can be synthesized in a conventional manner, in which case the reaction of the appropriately substituted, cyclic hydrocarbon anions with halides of titanium, zirconium, hafnium, vanadium, niobium or tantalum is preferred. Examples of corresponding methods of preparation are described inter alia in Journal of Organometallic Chemistry, 369 (1989), 359–370.

The metallocene complexes can also be present in cationic form, as described in EP-A-277 003 and EP-A-277 004.

As well as the metallocene complexes, the catalyst systems used for producing the block copolymers of the present invention additionally include oligomeric aluminum oxide compounds. Suitable are, for example, open-chain or cyclic alumoxane compounds of the general formulae III or IV

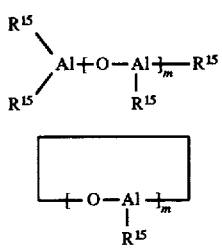

where $R^{15}$ is $C_1$–$C_4$alkyl, preferably methyl or ethyl, and m is an integer from 5 to 30, preferably from 10 to 25.

These oligomeric alumoxane compounds are customarily prepared by reacting a solution of trialkylaluminum with water, for example as described in EP-A-284 708 and U.S. Pat. No. 4 794 096.

Typically, the oligomeric alumoxane compounds obtained are mixtures of both linear and cyclic chain molecules that differ in length, so that m must be deemed an average value. The alumoxane compounds can also be present mixed with other metal alkyls, preferably with aluminum alkyls.

It is advantageous to use the complex of metals of subgroups IV and V of the Periodic Table and the oligomeric alumoxane compound in such amounts that the atomic ratio between the aluminum or the oligomeric alumoxane compound and the transition metal of the complex of metals of subgroups IV and V of the Periodic Table is within the range from 10:1 to $10^6$:1, in particular within the range from 10:1 to $10^4$:1.

Solvents for these catalyst systems are customary aromatic hydrocarbons, preferably having from 6 to 20 carbon atoms, in particular xylenes and toluene and mixtures thereof.

The multiphase propylene block copolymers of the present invention are advantageously produced using a supported catalyst system. Suitable support or carrier materials include, for example, silica gels, preferably those of the formula $SiO_2 \cdot x\, a\, Al_2O_3$, wherein a is from 0 to 2, preferably from 0 to 0.5; these are essentially alumosilicates or silicon dioxide. Preferably the carriers have a particle diameter within the range from 1 to 200 μm, in particular from 30 to 80 μm. Products of this type are commercially available, for example from Grace as Silica Gel 332.

In a particularly preferred process for producing the multiphase propylene block copolymers of the present invention, the first step comprises the preparation of the carrier material for the catalyst, the second the preparation of the supported catalyst complex and the third the polymerization.

The carrier material is advantageously prepared by suspending the moist silica gels in hydrocarbons, preferably in heptane, adding trialkylaluminum, preferably triethylaluminum, filtering and drying.

The supported catalyst complex is preferably prepared by admixing the metallocene complex of the general formula II with a solvent, in particular with toluene, and adding a solution of oligomeric alumoxane compounds of the general formulae III or IV, preferably methyl alumoxane, in which case the solvent used is in particular that which was also used in the case of the metallocene complex, ie. preferably toluene. Then the carrier material is added in a weight ratio of catalyst to carrier material of from 10:1 to 1000:1, preferably from 100:1 to 500:1. The solvent is then removed to obtain a catalyst powder.

The first stage of the actual polymerization is preferably carried out in the gas phase, typically by initially charging an autoclave with polypropylene grit and adding trialkylaluminum, preferably triethylaluminum, as cocatalyst. The weight ratio of polypropylene grit to trialkylaluminum is generally within the range from 10:1 to 10,000:1, preferably from 20:1 to 200:1. Then 30% by weight, based on the amount of trialkylaluminum, of supported catalyst are added, the temperature is raised to as high as 100° C., preferably to 70° C., and the internal pressure is raised as high as 50 bar, preferably 28 bar, by the addition of propylene. This is followed by the actual polymerization, and consumed propylene is continuously replaced with new propylene. If the polymer a) obtained in the first polymerization stage contains further $C_2$–$C_{10}$ 1-alkenes, a mixture of propylene and one or more further $C_2$–$C_{10}$ 1-alkenes is continuously added in a partial pressure ratio between propylene and the further $C_2$–$C_{10}$ 1-alkenes within the range from 10:1 to 10,000:1, preferably within the range from 20:1 to 5000:1.

In the presence of the metallocene catalyst used in the first polymerization stage, the latter is followed by the second polymerization stage to prepare copolymer b), customarily in the presence of polymer a). To this end, said polymer a) is preferably discharged from the first polymerization stage together with the metallocene catalyst system and transferred into the second polymerization stage, where a mixture of propylene and one or more $C_2$–$C_{10}$ 1-alkenes is polymerized onto it. Here it may be advisable to add further metallocene catalysts of the general formula II and optionally also alumoxane compounds of the general formulae III or IV. The second polymerization stage is customarily carried out at a pressure of from 5 to 40 bar, in particular of from 10 to 40 bar, and at a temperature of from 30° to 80° C., in particular of from 40° to 75° C., and the consumed comonomers are continuously replaced with new comonomers. It is preferable to set a partial pressure ratio between propylene and the further $C_2$–$C_{10}$ 1-alkene(s) within the range from 0.01:1 to 100:1, in particular within the range from 0.05:1 to 20:1. By changing the partial pressure ratio and by adding another $C_2$–$C_{10}$ 1-alkene, the second polymerization stage may in certain circumstances also be used to produce two or more different copolymers b). After the polymerization has ended, the autoclave is decompressed.

Apart from an autoclave, the process leading to the multiphase block copolymers of the present invention can also be carried out in other customary reactors, for example in a reactor cascade. The process can be carried out continuously, semicontinuously or batchwise.

The molecular weight of the obtainable polymers can be controlled in the usual manner by addition of regulators, in particular by the addition of hydrogen. It is also possible to use inert gases such as nitrogen or argon.

The multiphase propylene block copolymers of the present invention have a reduced melting point, a narrow molecular weight distribution $\overline{Mw}/\overline{Mn}$ (ratio of weight average molecular weight —$\overline{Mw}$— to number average molecular weight —$\overline{Mn}$—) and also a high shape stability, which manifests itself in particular in the form of high stiffness values. The block copolymers of the present invention have good processing properties; can be used in many sectors; and are useful in particular for producing films/sheets, fibers and shaped articles.

EXAMPLES

Example 1 a) Preparation of carrier material

To a suspension of 20.2 g of silica gel (from Grace, SG 332, particle diameter 20–45 μm) in 200 ml of heptane were added 56 ml of a solution of 6.4 g of triethylaluminum in 48 ml of heptane by dropwise addition at room temperature over 30 min. The temperature rose to 44° C. The mixture was stirred at room temperature for 18 hours and then filtered, and the filter residue was washed twice with 30 ml of pentane each time and then dried under oil pump vacuum.

b) Preparation of supported metallocene component

50 μmol of dimethylsilanediylbis(2-methylbenzo[e]indenyl)zirconium dichloride (29 mg) in 20 ml of toluene were admixed with 13.1 ml (20 mmol) of a solution of methylalumoxane in toluene (1.53 molar, from Witco GmbH) by stirring for 15 min. 5 g of the carrier material were then added and the mixture was stirred for a further 30 min. Finally, the solvent was removed at room temperature over 4 hours under oil pump vacuum. A free-flowing catalyst powder was obtained.

c) Polymerization

A dry, nitrogen-purged 10 liter autoclave was successively charged with 50 g of propylene grit and 4.8 ml of triethylaluminum (1M solution in heptane), and this initial charge was stirred for 15 min. 1.5 g of the supported catalyst were then introduced into the reactor in a countercurrent stream of nitrogen, and the reactor was sealed. It was then heated to 70° C. at a stirrer speed of 350 rpm while at the same time the internal pressure was raised step by step to the final pressure of 28 bar by the addition of propylene. This was followed by a polymerization for 1.5 hours, during which the automatic pressure control system ensured replenishment with fresh propylene.

The second polymerization stage was then carried out to polymerize propylene and ethylene onto the polymer obtained in the first stage. To this end, the pressure was reduced to 7.5 bar, and then ethylene was introduced to bring it back up to 15 bar and subsequently set it to 9.5 bar. A mixture of propylene and ethylene was continuously polymerized in the gas phase over 30 minutes during which a partial pressure ratio between propylene and ethylene of 1:1 was maintained. The polymerization temperature was 70° C. After the polymerization had ended, the pressure was reduced to atmospheric and after 10 minutes the resulting block copolymer was discharged in a stream of nitrogen.

Example 2

Example 1 was repeated with a second polymerization stage of only 15 minutes.

Example 3

Example 1 was repeated with the first polymerization stage of only 60 minutes.

Example 4

Example 1 was repeated with a first polymerization stage of only 60 minutes and a second polymerization stage extended to 45 minutes.

The compositions and properties of the multiphase block copolymers are summarized in the table below.

The viscosity was determined by means of an Ubbelohde viscometer, the weight average $\overline{M}w$ and the number average $\overline{M}n$ were each determined by gel permeation chromatography, and the melting point was determined by differential scanning calorimetry (DSC). The shear modulus G was determined in accordance with DIN 53 455.

TABLE

| Example | 1 | 2 | 3 | 4 |
|---|---|---|---|---|
| Atomic ratio aluminum:zirconium | 800:1 | 800:1 | 800:1 | 800:1 |
| Proportion of polymer a) in block copolymer [% by weight] | 80 | 90 | 60 | 50 |
| Proportion of polymer b) in block copolymer [% by weight] | 20 | 10 | 40 | 50 |
| Productivity amount of polymer/ amount of supported catalyst | 2750 | 3210 | 2530 | 2995 |
| Yield [g] | 1833 | 2140 | 1687 | 1997 |
| Weight average ($\overline{M}w$) | 376000 | 310000 | 401000 | 417000 |
| Polydispersity (Mw/Mn) | 1.87 | 1.83 | 1.98 | 2.01 |
| Melting point [°C.] | 144.2 | 145.6 | 143.2 | 143.1 |
| Stiffness (shear modulus G) [N/mm²] | 675 | 770 | 515 | 410 |

We claim:

1. A multiphase block copolymer of propylene, comprising
   a) a polymer of propylene with from 0 to 5% by weight of further $C_2$–$C_{10}$ 1-alkenes,
   b) a copolymer of propylene with from 5 to 98% by weight of further $C_2$–$C_{10}$ 1-alkenes,
   the multiphase block copolymers having a melting point of less than 155° C. and a stiffness (shear modulus G) conforming to the following condition (I):

$$G \text{ modulus} > 800 \times \frac{M_{a)}}{M_{\infty}} \qquad (I)$$

where $M_{a)}$ denotes the amount by weight of propylene polymer a) and $M_{\infty}$ denotes the amount by weight of the multiphase block copolymer wherein B modulus is in units of MPa, as determined by DIN 53 455.

2. Multiphase block copolymers as claimed in claim 1 having a melt flow index of from 0.1 to 100 g/10 min at 230° C. under a weight of 2.16 kg.

3. Multiphase block copolymers as claimed in claim 1, comprising from 20 to 98% by weight of polymer a) and from 2 to 80% by weight of copolymer b).

4. Multiphase block copolymers as claimed in claim 1, comprising from 0.01 to 5 parts by weight of a nucleating agent per 100 parts by weight of the multiphase block copolymer.

5. Multiphase block copolymers as claimed in claim 1, wherein polymer a) is a propylene homopolymer.

6. A process for producing multiphase block copolymers as defined in claim 1, which comprises conducting a first polymerization stage at temperatures within the range from 0° to 100° C. and pressures within the range from 1 to 300 bar to polymerize propylene, optionally in the presence of further $C_2$–$C_{10}$ 1-alkenes, and then conducting a second polymerization stage at temperatures within the range from 0° to 100° C. and pressures within the range from 1 to 300 bar to polymerize a mixture of propylene and further $C_2$–$C_1$ 1-alkenes onto a polymer a) obtained from the first polymerization stage; this multistage polymerization being carried out in the presence of catalyst systems comprising, as active constituents, metallocene complexes of metals of subgroups IV and V of the Periodic Table and oligomeric aluminum oxide compounds.

7. A process as defined in claim 6, wherein the polymerization of the first and second polymerization stages is carried out in the gas phase.

8. A process as defined in claim 6, wherein the metallocene complexes of metals of subgroups IV and V of the Periodic Table are metallocene complexes of the formula II:

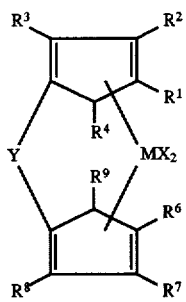

where

M is titanium, zirconium, hafnium, vanadium, niobium or tantalum.

x is fluorine, chlorine, bromine, iodine, hydrogen, $C_1$–$C_{10}$ alkyl, $C_6$–$C_{15}$ aryl or —$OR^5$, where $R^5$ is $C_1$–$C_{10}$ alkyl, $C_6$–$C_{15}$ aryl, alkylaryl, arylalkyl, fluoroalkyl or fluoroaryl having in each case from 1 to 10 carbon atoms in the alkyl moiety and from 6 to 20 carbon atoms in the aryl moiety, $R^1$ to $R^4$ and $R^6$ to $R^9$ are each hydrogen, $C_1$–$C_{10}$ aryl, 5-, 6- or 7-membered cycloalkyl which in turn may carry $C_1$–$C_{10}$ alkyl substituents, $C_6$–$C_{15}$ aryl or arylalkyl, where two adjacent radicals optionally may be combined to form cyclic saturated, partially saturated or unsaturated groups having from 4 to 15 carbon atoms, or $Si(R^{10})_3$ where $R^{10}$ is $C_1$–$C_{10}$ alkyl, $C_6$–$C_{15}$ aryl or $C_3$–$C_{10}$ cycloalkyl,

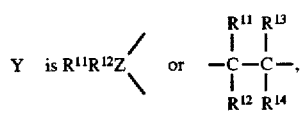

where
z is silicon, germanium, tin or carbon.
$R^{11}$, $R^{12}$, $R^{13}$ and $R^{14}$ are each hydrogen, $C_1$–$C_{10}$ alkyl, $C_3$–$C_{10}$ cycloalkyl or $C_6$–$C_{15}$ aryl, where two adjacent radicals optionally may be combined to form cyclic groups having from 4 to 15 carbon atoms, and the oligomeric aluminum oxide compounds are open-chain or cyclic alumoxane compounds of the formulae III or IV

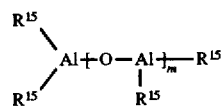

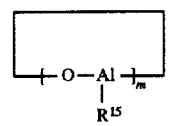

where $R^{15}$ is $C_1$–$C_4$ alkyl and m is an integer from 5 to 30.

9. Fibers, films/sheets and shaped articles formed from the multiphase block copolymers of claim 1.

10. A multiphase block copolymer as defined in claim 1, wherein polymer (a) contains from 0 to 3% by weight of further $C_2$–$C_{10}$ 1-alkenes.

11. A multiphase block copolymer as defined in claim 1, wherein copolymer (b) contains from 10 to 50% by weight of further $C_2$–$C_{10}$ 1-alkenes.

12. A multiphase block copolymer as defined in claim 1, comprising 50 to 90% by weight of polymer (a) and 10 to 50% by weight of polymer (b).

* * * * *

UNITED STATES PATENT AND TRADEMARK OFFICE
CERTIFICATE OF CORRECTION

PATENT NO.: 5,753,773

DATED: May 19, 1998

INVENTOR(S): LANGHAUSER et al.

It is certified that error appears in the above-identified patent and that said Letters Patent is hereby corrected as shown below:

Col. 8, claims 2-5, line 1 of each, "Multiphase block copolymers as claimed in" should be --A multiphase block copolymer as defined in--.

Col. 8, claim 6, line 58, "$C_2$-$C_1$" should be -- $C_2$-$C_{10}$ --

Col. 9, claim 8, line 24, "$C_1$-$C_{10}$" should be --$C_1$-$C_{10}$ --.

Signed and Sealed this

Twenty-ninth Day of September, 1998

BRUCE LEHMAN

*Attest:*

*Attesting Officer*          Commissioner of Patents and Trademarks